(12) United States Patent
Maier et al.

(10) Patent No.: US 6,872,479 B2
(45) Date of Patent: Mar. 29, 2005

(54) COATED OPTICS TO IMPROVE DURABILITY

(75) Inventors: Robert L. Maier, Ontario, NY (US); Robert W. Sparrow, Sturbridge, MA (US); Paul M. Then, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/718,356

(22) Filed: Nov. 18, 2003

(65) Prior Publication Data

US 2004/0202225 A1 Oct. 14, 2004

Related U.S. Application Data

(60) Provisional application No. 60/462,518, filed on Apr. 11, 2003.

(51) Int. Cl.[7] .................................................. B32B 9/04
(52) U.S. Cl. ...................... 428/696; 428/689; 428/699; 428/700; 428/336
(58) Field of Search ................................ 428/220, 332, 428/336, 688, 689, 696, 699, 700, 704

(56) References Cited

U.S. PATENT DOCUMENTS 4,101,707 A * 7/1978 Henry ........................ 428/409
5,403,673 A * 4/1995 Haga et al. .................. 428/688
6,466,365 B1 10/2002 Maier et al. ................. 359/355
2001/0008540 A1 * 7/2001 Oba et al. .................... 372/101

OTHER PUBLICATIONS

"Characteristics of deep UV Optics at 193nm & 157nm" G.P. Callahan, et al, Society of Photo–Optical Engineers, 1998.
"Plasma Technology" Kirk–Othmed Encyclopedia of Chemical Technology, 4th Ed vol. 19, pps. 226–257.
"Thin Films" Kirk–Othmed Encyclopedia of Chemical Technology, 4th Ed vol. 23, pps. 1040–1076.

* cited by examiner

Primary Examiner—Stephen Stein
(74) Attorney, Agent, or Firm—Walter M. Douglas

(57) ABSTRACT

The invention is directed to a coated metal fluoride crystals that are resistant to laser-induced damage by a below 250 nm UV laser beam; methods of making such coated crystals, and the use of such coated crystals. The method includes the steps of providing an uncoated metal fluoride crystal of general formula $MF_2$, where M is beryllium, magnesium, calcium, strontium and barium, and mixtures thereof, and coating the uncoated metal fluoride crystal with a coating of a selected material to thereby form a coated metal material resistant to laser induced damage. Preferred coating materials include $MgF_2$, $MgF_2$ doped fused silica and fluorine doped fused silica.

14 Claims, 2 Drawing Sheets

COATED OPTICS TO IMPROVE DURABILITY

CLAIM OF PRIORITY

This application claims the benefit priority of U.S. provisional application No. 60/462,518 filed Apr. 11, 2003.

FIELD OF THE INVENTION

This invention is directed to optics useful for the transmission of electromagnetic radiation below 250 nanometers (nm), and especially in the area of laser lithography. In particular, the invention is directed to coatings that can be used to improve the durability of metal fluoride crystal optical materials used in laser lithography and other application.

BACKGROUND OF THE INVENTION

The use of high power lasers, for example, those with a power density (fluence) above 80 mJ/cm$^2$ with pulse lengths in the low nanometer range, can degrade the optics used in laser lithography systems. T. M. Stephen, B. Van Zyl, R. C. Amme, "Degradation of Vacuum Exposed SiO2 Laser Windows", SPIE Vol. 1848, pp. 106–109 (1992), report on the surface degradation of fused silica in Ar-ion laser. More recently, it has been noticed that there is optical window surface degradation in high peak and average power in 193 nm excimer laser using window materials made from substances other than silica. It is a concern that such degradation will be more severe when existing optical materials are used in 157 nm laser systems. While some solutions, for example, such as using MgF$_2$ as the window material for existing 193 nm laser systems, have been proposed, it is believed that such materials will also experience surface degradation with time, leading to the requirement that the expensive windows be periodically replaced. It is further believed that the problem with window degradation will be exacerbated with the advent of lasers systems operating at wavelengths below 193 nm. In addition, the use of MgF$_2$ as a window material, while it might be successful from a mechanical viewpoint, presents a problem of color center formation that is detrimental to transmission performance of the laser beam. Consequently, it is desirable to find a solution to the window degradation problem that will either eliminate the problem or will greatly extend the durability, and consequently the length of time, that existing and future optical windows can be used.

SUMMARY OF THE INVENTION

In one aspect, the invention is directed to coated monocrystals of any formula that experience electromagnetic radiation induced damage problems similar to those described herein.

In another aspect the invention is directed to coated optical materials that are useful in laser lithography. In particular embodiments, the invention is directed to coated optical path materials for use as windows, lenses and other optical elements in laser lithography.

In another aspect the invention is directed to the use of coated metal fluoride optical path materials, particularly monocrystalline metal fluoride optical path materials, for wavelength transmission in the X-ray, visible, UV, infrared regions of the electromagnetic spectrum. The metal fluorides are of general formula MF$_2$, where M is beryllium, magnesium, calcium, strontium and barium, and mixtures thereof.

The coating material used in accordance with the invention can be any material being transmissive in the X-ray, infrared, UV and visible regions of the electromagnetic spectrum. For applications operating at wavelengths below 250 nm, the preferred coating materials for the foregoing MF$_2$ materials are SiN, MgF$_2$, MgF$_2$ doped high purity silica and fluorine doped high purity silica. The coatings are typically deposited on the surface of the MF$_2$ optical material by methods known in the art, for example, vapor deposition, chemical vapor deposition ("CVD"), plasma enhanced chemical vapor deposition ("PECVD"), and other "plasma" deposition methods including sputter deposition.

The invention is further directed to a method of making a coated metal fluoride crystal that is resistant to laser-induced damage by a below 250 nm US laser beam. The method includes the steps of providing an uncoated metal fluoride crystal of general formula MF$_2$, where M is beryllium, magnesium, calcium, strontium and barium, and mixtures thereof, and coating the uncoated metal fluoride crystal with a coating of a selected material to thereby form a coated metal material resistant to laser induced damage.

DETAILED DESCRIPTION OF THE INVENTION

Figure 1:
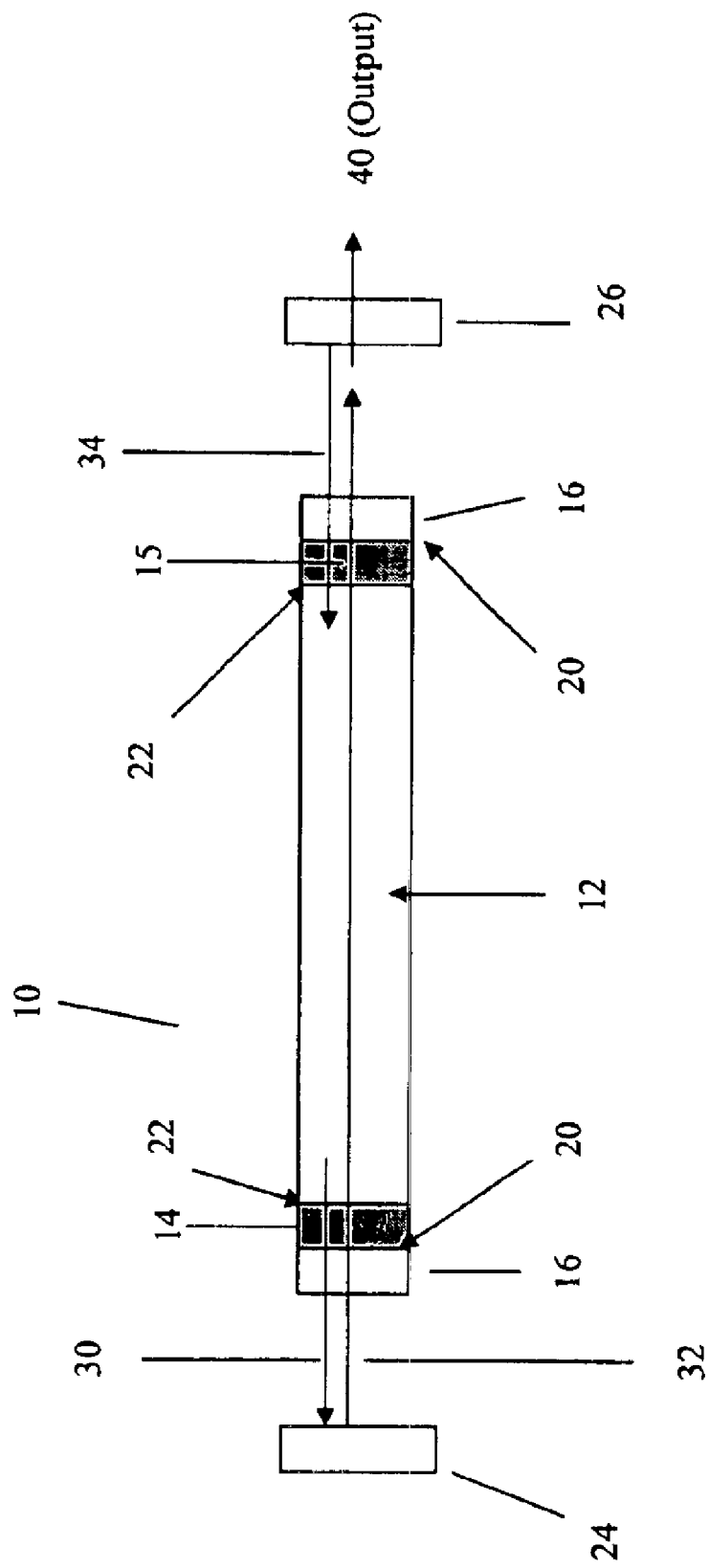
FIG. 1 is a generalized illustration of a laser chamber having two coated windows in accordance with the invention.

As used herein, the terms "optical substrates" and "optical materials" include, among others, optical elements such as the chamber windows used in laser systems, beamsplitters, optical lenses and other optical elements. Included among the optical materials are optical materials that are single- or mono-crystals made by methods known in the art. For example, monocrystals of MF$_2$ crystals can be made by the Stockbarger method (see J. Opt. Soc. Am. 14, 448 (1927)); the Bridgeman-Stockbarger, Kyropulos and Czochralski methods; the methods described in U.S. Pat. Nos. 6,485,562, 6,402,840, 6,364,946, 4,521,272 and 4,404,172; and other methods known in the art.

Also herein, optical materials or substrates made from monocrystals of calcium fluoride, CaF$_2$, are used to exemplify the invention and the methods used to accomplish it. It should be understood that optical substrates made from other materials of formula MF$_2$ as described herein can also be used.

Information on appropriate coating deposition techniques, for example, chemical vapor deposition, plasma techniques and sputtering techniques, among others, can be found in Kirk-Othmer, Encyclopedia of Chemical Technology, 4$^{th}$ Ed. (John Wiley & Sons, New York, 1996), Vol. 19, pages 226–257 (Plasma Technology) and Vol. 23, pages 1040–1067 (Thin Films-Film Formation Techniques), the references cited therein, and other references known to those skilled in the art.

The coated optical substrates according to the invention can be used in a wide range of applications. Examples of such applications, without limit, include CO laser windows, europium-doped X-ray windows, excimer beam delivery optics, excimer laser windows, FTIR beamsplitter substrates, HDTV lenses, HF/DF laser windows, infrared domes, microscope apochromat, photomultiplier windows, polarizers, spectrographic camera lenses, Rochon prisms, PID lamps and telescope lenses. The coated optical substrates of the invention are particularly useful in laser systems, and such systems described herein for illustrative purposes and are not to be construed as limiting the invention to such use. That is, the invention can be used in laser embodiments in addition to that described herein as an example.

The three requirements for a laser are a material that possesses an appropriate set of upper and lower energy levels (the active medium), some means of pumping or exciting the atoms or molecules to excited upper levels while at the same time leaving the lower energy levels empty, and some method for creating resonant feedback so that light can pass back-and-forth through the active medium. It is during these passes that the light is amplified by the stimulated emission process and increases in intensity. In many lasers, for example gas/vapor lasers such as $CO_2$, ArF, and KrF lasers, the laser has a chamber containing the gas/vapor (the "medium"), and windows on either end of the chamber to contain the gas/vapor and these windows are made a material transparent to the light being amplified within the chamber.

As mentioned above, the third requirement of a laser is some structure that provides feedback of the laser light into the chamber containing the material being excited. Generally, this structure is the chamber itself and two mirrors, one of which is located at each end of the chamber. The combination of the chamber containing the medium and the mirrors are called the resonant cavity. These mirrors provide for multiple passes through the medium in the chamber and thus provides for the amplification of the laser light via stimulated emission over a greater distance through the medium than would be possible in a single pass. Usually, one of the mirrors is 100% or nearly 100% reflecting and the other mirror is partially reflecting to allow emission of some of the light as the output of the laser. The output is what is used to perform the actual work. As the light passes back and forth through the windows of the chamber, the windows can become damaged and problems arise as has been explained above. Consequently, in accordance with the invention it is desirable to coat the windows with a material that will prevent such damage to the windows. In addition, the partially transparent mirror may also become damaged during use. Consequently, it may be desirable to coat such mirror in accordance with the invention.

FIG. 1 is a generalized illustration of a laser resonance cavity 10 having a chamber 12 containing the material that is excited to produce the laser light or radiation, mirrors 24 and 26, and various other elements (not illustrated) for the generation of laser radiation. In FIG. 1, mirror 24 is a 100% reflective or nearly 100% reflective mirror and mirror 26 is a partially reflective mirror that allows some of the laser radiation to pass through as an output 40 for useful work. The chamber 12 has windows 14 and 15 with coating 16 in accordance with the invention to prevent damage to the windows. While FIG. 1 illustrates windows 14 and 15 having coating 16 on the "exterior" of the windows, the "interior" side 22 of the windows, that is, the side facing the material in chamber 12, can also be coated in accordance with the invention. (Interior coating not illustrated). Laser radiation is generated within chamber 12 and exits through windows 14 and 15. The radiation 30 exiting coated window 14 strikes mirror 24 and is reflected back as radiation 34 through coated window 14 into chamber 12 wherein it is further excited and exits coated window 15 to strike partially reflective mirror 26. Part of the radiation 32 striking mirror 26 passes through the mirror as output 40 and the remainder is reflected back though coated window 15 into chamber 12 for amplification and use. The radiation exiting window 15 and passing through partially reflective mirror 26 can be high fluence radiation suitable for lithographic work. In an alternative embodiment, window 14 is uncoated and window 15 is coated.

In addition to coating window 14 and 15 of their respective exterior sides 20, other coating combinations are possible. For example, window 15 is coated on the exterior side 20 and window 14 is uncoated; windows 14 and 15 are coated on both the interior and exterior sides 22 and 20, respectively; window 14 is coated on both interior 22 and exterior 20 sides, and window 15 is coated on exterior side 20; and other such combinations. Further, the mirrors 24 and 26 can also be coated in accordance with the invention. Reflective mirror 24 would usually be coated on the reflective (radiation 30 incident) side. Mirror 26 can be coated on both partially reflective (radiation 32 incident) and the output 40 side.

Figure 2:
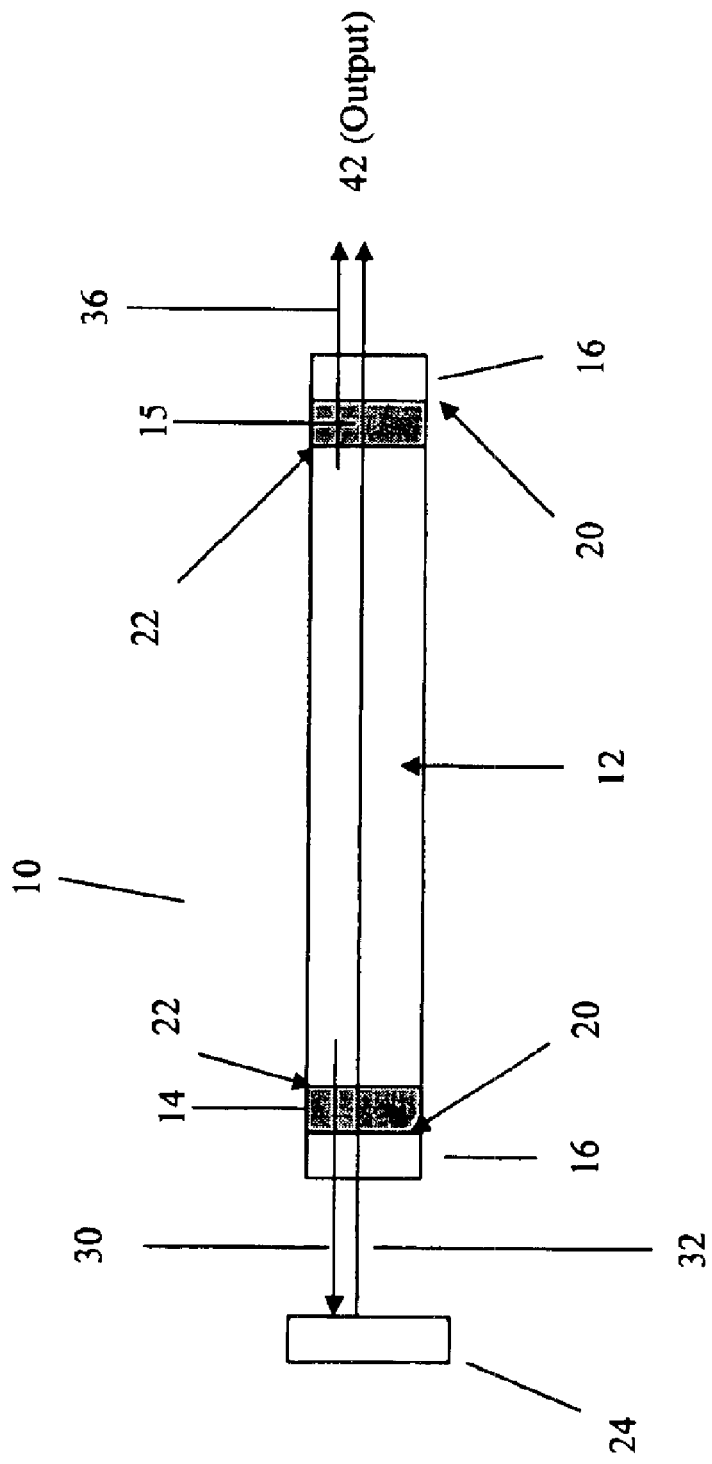
FIG. 2 is a generalized illustration of a laser chamber having a single coated window in accordance with the invention.

FIG. 2 represents an embodiment in which there is a single reflective mirror 24. The initial radiation generated within chamber 12 exits through coated window 15 along with radiation 32 reflected from mirror 24 as output 42. Other elements are the same as in FIG. 1.

Laser damage in optical substrates or elements, for example, the windows 14 and 15, can occur at both the interior 22 and exterior 20 sides of the windows as is illustrated in FIG. 1, but generally occurs and/or is more intense at the exterior side 20 due to higher electric field intensities at the exit face. For CaF2 optics, which have a cubic crystal structure, the mechanism that results in damage to the optical material is believed to result from a progression of events beginning with promotion of electrons to the conduction band and the formation of Vk centers, some of which become a closed F—H pair (fluorine-hydrogen) that can decay to the ground state with the emission of a photon. In addition, or as an alternative, the F—H pair can absorb a laser photon that leads to the separation of the closed pair which in turn can lead to emission of fluorine from the surface and agglomeration of "F" centers to yield calcium metal colloids. The emission of fluorine from the surface of the window material thus creates a vacancy. When this vacancy is at the exit of the material, it is feasible that a fluorine atom from within the crystal lattice (a direction toward the entry end of the monocrystal's lattice) can migrate to the end void, thereby creating an interior void in the monocrystal lattice. Subsequently, a fluorine atom from further toward the entry end of the crystal lattice can migrate into the newly created void, and the void/replacement process can continue until a void appears on the entry face of the crystal lattice. The presence of these entry face voids, as well as those in other positions of the crystal lattice, are detrimental to the transmission characteristics of the optical material. For example, among the problems that can occur is that the voids' can increase birefringence and cause the formation of a color center formation.

There is a completely different and yet simple theory as to why a coating works; for example the F-HPFS coating described below. Under this theory the protective coating prevents contaminant levels (ppm/ppb) of OH— radicals or others reactant present in an N2 purge gas or in the atmospheric environment of the optical element from depositing on the surface of the optic. These radicals then react with the surface and initiate the catastrophic failure as described above.

In accordance with the invention, a coating is placed on the exterior side of the optical substance will be useful in minimizing or eliminating the window problems created by the use of high power lasers. To form the coated optical material of the invention, one first grows an optical monocrystal by method known in the art. As is known in the art, care must be taken during the growth of the monocrystal to avoid the formation of stress within the crystal and to avoid the formation of undesirable lattice structures within the monocrystal.

Once the monocrystal is obtained, it is formed and shaped into the desired structure by methods known in the art. For example, the monocrystal is first cut and/or ground to form an optical substrate having a selected shape (for example, circular, rectangular or oblate of any dimension [diameter, length, width]) and selected thickness appropriate to the intended use. Once this first cut and/or grinding is done, the resulting optical substrate may, optionally or if necessary, be further processed to refine the dimensions to the those closer to the intended use and to polish the entry and exit faces of the optical substrate. The surface may be polished with aluminum oxide, chromic oxide or diamond-based polishing powders using either pitch or cloth laps. In preferred embodiments the surfaces are polished. Once the polishing, if any, is completed, the optical substrate is then coated with a selected coating by any suitable method known in the art. While methods such as vapor deposition, chemical vapor deposition, plasma enhanced chemical vapor deposition, sputter deposition and plasma deposition may be used in practicing the invention, the preferred methods are plasma deposition methods and particularly sputtering methods. Examples of sputtering methods may be found in Kirk-Othmer, cited above, and references cited therein.

The coating can be applied to either the entry or the exit face (in fact the exit face is the most important in the application) of the optical substrate. When applied by plasma methods, for example, sputtering, a source of the coating material (the target) is placed in an evacuated chamber in the sputter device. The substrate, that is, the material to be coated, is similarly placed in the coating chamber. Coating material is ejected from the surface of the substrate by momentum transfer from an atomic-sized energetic bombarding particle. This particle is usually a gaseous ion accelerated from a plasma or ion gun. The ejected material and the incoming ion material travel in a direction from the target to the substrate where is condenses on the surface of the substrate. In the sputtering process the composition of the vapor leaving the target surface is the same as the bulk composition of the target, provided that there is no diffusion in the target as is the case with the coating material used in practicing the invention. In accordance with the invention, coatings having a thickness in the range of 20–300 nm, preferably in the range of 20–150 nm, and most preferably in the range of 20–100 nm have been applied to the surface of the optical substrate. After the optical substrate has been coated, the coated surface may be polished by method known in the art prior for use in a laser. The surface may be polished with aluminum oxide, chromic oxide or diamond-based polishing powders using either pitch or cloth laps.

The selected coating materials used in practicing the invention can be a coating of any inorganic material transmissive to electromagnetic radiation below 250 nm wavelength and particularly below 200 nm wavelength. Preferred materials are SiN, $MgF_2$, $MgF_2$ doped high purity silica and fluorine doped high purity silica. For example, one may use HPFS® Fused Silica made by Corning Incorporated, Corning, N.Y., that has been doped with $MgF_2$ or fluorine. Other coating materials that are transparent to laser radiation below 250 nm, preferably below 193 nm, and most preferable at about 157 nm, can also be used in practicing the invention. When $MgF_2$ doped high purity silica and fluorine doped high purity silica are used in practicing the invention, the $MgF_2$ content of the high purity silica is in the range of 0.2% to 6% by weight, and preferably in the range of 0.02 to 4% by weight; and the fluorine content of the high purity fused silica is in the range of 0.02 to 6% by weight, preferable in the range of 0.2% to 4% by weight. The high purity silicas used in practicing the invention generally have an OH content in the range of 800–1600 ppm and a total impurity level (e.g., Fe, Ti, Ni, S, P, etc.) of less than 800 ppb. When $MgF_2$ is used as the coating material, the preferred material is that suitable for in the formation of a monocrystal for use as window in lasers.

One factor in selecting the coating material is the refractive index ("RI") of the material. The refractive index of the coating materials should match as nearly as possible the refractive index of the $MF_2$ window substrate, and preferably should be the same as that of the $MF_2$ window substrate. For example, the RI of fluorine doped HPFS® (F-HPFS hereafter) exactly matches that of $CaF_2$. Consequently, for a $CaF_2$ window, the choice of F-HPFS as a coating material allows the window to be designed and applied as if there were no coating. Relative to a window without a coating, the angles of incidence, TIR designs and prisms do not have to be altered to apply the coating.

However, while an exact match in RI is preferred, it is not an absolute requirement. In some instances an anti-reflective coating may be preferred depending on the application in which the coated substrate is going to be used. For example, in a beamsplitter in which one does not one side of the splitter to be reflecting. In such an instance the coating would be both protective and anti-reflective. Silicon nitride, SiN, would be one material that could be used as a coating in such circumstances.

To illustrate the invention, $CaF_2$ windows with various coating levels of F-HPFS were prepared. The F-HPFS is doped with fluorine in amounts in the range of 0.2% to 4% by weight. In Table 1 below, low F-HPFS has a fluorine content in the approximate range of 0.2–1% by weight, medium F-HPFS has a fluorine content in the approximate range of 1–2% by weight, and high F-HPFS has a fluorine content in the range of 2–4% by weight.

TABLE 1

| Sample Number | Coating Thickness (nm) | Plasma Cleaning of | Material | Deposition Technique | Comments |
|---|---|---|---|---|---|
| 1 | 65 | No | F—HPFS | Plasma | Control |
| 2 | 65 | Yes | F—HPFS | Plasma | |
| 3 | 65 | Yes | HPFS | Plasma | |
| 4 | 25 | Yes | Low-F—HPFS | Plasma | |
| 5 | 25 | Yes | High-F—HPFS | Plasma | |
| 6 | 25 | No | Low-F—HPFS | Plasma | |
| 7 | 25 | No | High-F—HPFS | Plasma | |
| 8 | 100 | Yes | Low-F—HPFS | Plasma | |
| 9 | 100 | Yes | High-F—HPFS | Plasma | |
| 10 | 100 | No | Low-F—HPFS | Plasma | |
| 11 | 100 | No | High-F—HPFS | Plasma | |
| 12 | 65 | Yes | HPFS | CVD | |
| 13 | 65 | Yes | 1% F—HPFS | CVD | |
| 14 | 65 | Yes | Highest F-conc. | CVD | |
| 15 | 65 | Yes | SiN | CVD | |

The foregoing examples of specific compositions, processes, articles and/or apparatus employed in the practice of the present invention are, of course, intended to be illustrative rather than limiting, and it will be apparent the numerous variations and modification of these specific embodiments may be practiced within the scope of the appended claims.

We claim:

1. A coated optical material suitable for use as an optical path material in lasers operating below 250 nm comprising:
   a shaped optical monocrystal having an entry face and an exit face for laser radiation entering and exiting said crystal, and
   a coating on at least the exit face of said monocrystal, said coating selected from the group consisting of $MgF_2$ doped fused silica and fluorine doped fused silica;
   wherein when the coating is $MgF_2$ doped fused silica and the $MgF_2$ content of said $MgF_2$ doped fused silica is in the range of 0.2% to 4% by weight; and
   wherein when the coating is fluorine doped fused silica and the fluorine content of said fluorine doped fused silica is in the range of 0.2 to 4% by weight.

2. The coated optical material according to claim 1, wherein said monocrystal is of formula $MF_2$, wherein M is a metal selected from the group consisting of beryllium, magnesium, calcium, strontium and barium, and mixtures thereof, and F is fluorine.

3. The coated optical material according to claim 1, wherein the thickness of the coating is in the range of 20 to 300 nm.

4. The coated optical material 1 according to claim 1, wherein the thickness of the coating is in the range of 20 to 150 nm.

5. The coated optical material 1 according to claim 1, wherein the thickness of the coating is in the range of 20 to 100 nm.

6. The coated optical material according to claim 1, wherein the monocrystal is CaF2 and the coating is $MgF_2$ doped fused silica.

7. The coated optical material according to claim 1, wherein the monocrystal is CaF2 and the coating is fluorine doped fused silica.

8. A coated optical material suitable for use as an optical path material in lasers operating below 200 nm comprising:
   a shaped optical monocrystal having an entry face and an exit face for laser radiation entering and exiting said crystal, and
   a coating on at least the exit face of said monocrystal, said coating selected from the group consisting of $MgF_2$ doped fused silica where the $MgF_2$ content of said $MgF_2$ doped fused silica is in the range of 0.2 to 4% by weight and fluorine doped fused silica wherein the fluorine content of said fluorine doped fused silica is in the range 0.2 to 4% by weight.

9. The coated optical material according to claim 8, wherein said monocrystal is of formula $MF_2$, wherein M is a metal selected from the group consisting of beryllium, magnesium, calcium, strontium and barium, and mixtures thereof, and F is fluorine.

10. The coated optical material according to claim 8, wherein the thickness of the coating is in the range of 20 to 300 nm.

11. The coated optical material according to claim 8, wherein the thickness of the coating is in the range of 20 to 150 nm.

12. The coated optical material I according to claim 8, wherein the thickness of the coating is in the range of 20 to 100 nm.

13. The coated optical material according to claim 8 wherein the monococrystal is $CaF_2$ and the coating is $MgF_2$ doped fused silica.

14. The coated optical material according to claim 8 wherein the monococrystal is $CaF_2$ and the coating is fluorine doped fused silica.

* * * * *